United States Patent
Rutledge et al.

(10) Patent No.: US 11,454,171 B1
(45) Date of Patent: Sep. 27, 2022

(54) TURBINE COOLING SYSTEM WITH ENERGY SEPARATION

(71) Applicant: Government of the United States, as represented by the Secretary of the Air Force, Wright-Patterson AFB, OH (US)

(72) Inventors: James Rutledge, Fairborn, OH (US); Matthew Fuqua, Oakwood, OH (US); Carol Bryant, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 65 days.

(21) Appl. No.: 16/892,496

(22) Filed: Jun. 4, 2020

Related U.S. Application Data

(60) Provisional application No. 62/867,277, filed on Jun. 27, 2019.

(51) Int. Cl.
| | | |
|---|---|---|
| *F02C 7/18* | (2006.01) | |
| *F01D 5/18* | (2006.01) | |
| *F01D 25/12* | (2006.01) | |

(52) U.S. Cl.
CPC ............... *F02C 7/18* (2013.01); *F01D 5/186* (2013.01); *F01D 5/187* (2013.01); *F01D 25/12* (2013.01); *F05D 2260/202* (2013.01); *F05D 2260/209* (2013.01); *F23R 2900/03042* (2013.01)

(58) Field of Classification Search
CPC ............................ F05D 2260/209; F02C 7/18
See application file for complete search history.

(56) References Cited

U.S. PATENT DOCUMENTS

| | | | |
|---|---|---|---|
| 3,973,396 A | 8/1976 | Kronogard | |
| 4,291,530 A | 9/1981 | Ballard | |
| 4,293,275 A * | 10/1981 | Kobayashi | F02C 7/185 |
| | | | 416/97 R |
| 4,818,178 A * | 4/1989 | Sibbertsen | F25B 9/04 |
| | | | 415/115 |
| 8,221,055 B1 | 7/2012 | Liang | |
| 2008/0209914 A1 | 9/2008 | De Wergifosse et al. | |
| 2015/0068629 A1* | 3/2015 | Kottilingam | F15D 1/0015 |
| | | | 219/76.14 |

* cited by examiner

*Primary Examiner* — Katheryn A Malatek
*Assistant Examiner* — Alyson Joan Harrington
(74) *Attorney, Agent, or Firm* — AFMCLO/JAZ; Matthew D. Fair

(57) ABSTRACT

A method and system for cooling an engine and/or vehicle using energy separation is disclosed herein. An energy separation device is operable for separating a compressed gaseous coolant stream into a first relatively cooler coolant flow stream and a second relatively hotter coolant flow stream. The relative cooler coolant flow stream is directed to a first region requiring increased cooling and the relative hotter coolant flow stream is directed to a second region requiring lower cooling than the first region in the engine or vehicle.

12 Claims, 6 Drawing Sheets

TURBINE COOLING SYSTEM WITH ENERGY SEPARATION

RIGHTS OF THE GOVERNMENT

The invention described herein may be manufactured and used by or for the Government of the United States for all governmental purposes without the payment of any royalty.

TECHNICAL FIELD

The present disclosure generally relates to systems and methods for cooling a turbine engine and more particularly, but not exclusively to using energy separation to increase cooling system efficiency.

BACKGROUND

As the operating temperatures of gas turbine engines continue to increase due to increased power requirements, the cooling requirements also continue to increase. Cooling flow in a gas turbine engine is typically bled from the compressor and diverted to impinge on a hot component downstream of the compressor. Using compressed air to cool portions of the turbine engine in lieu of supplying all of the compressed air for combustion reduces the thermal efficiency of the engine. Many cooling schemes have been used in an attempt to reduce the amount of cooling air bled from the compressor, however, prior art cooling systems have various shortcomings, drawbacks, and disadvantages relative to certain applications. Accordingly, there remains a need for further contributions in this area of technology.

SUMMARY

One embodiment of the present disclosure includes a unique cooling system and method for a gas turbine engine or the like. Other embodiments include apparatuses, systems, devices, hardware, methods, and combinations wherein energy separation is implemented in the cooling system to increase in the efficiency of the engine. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
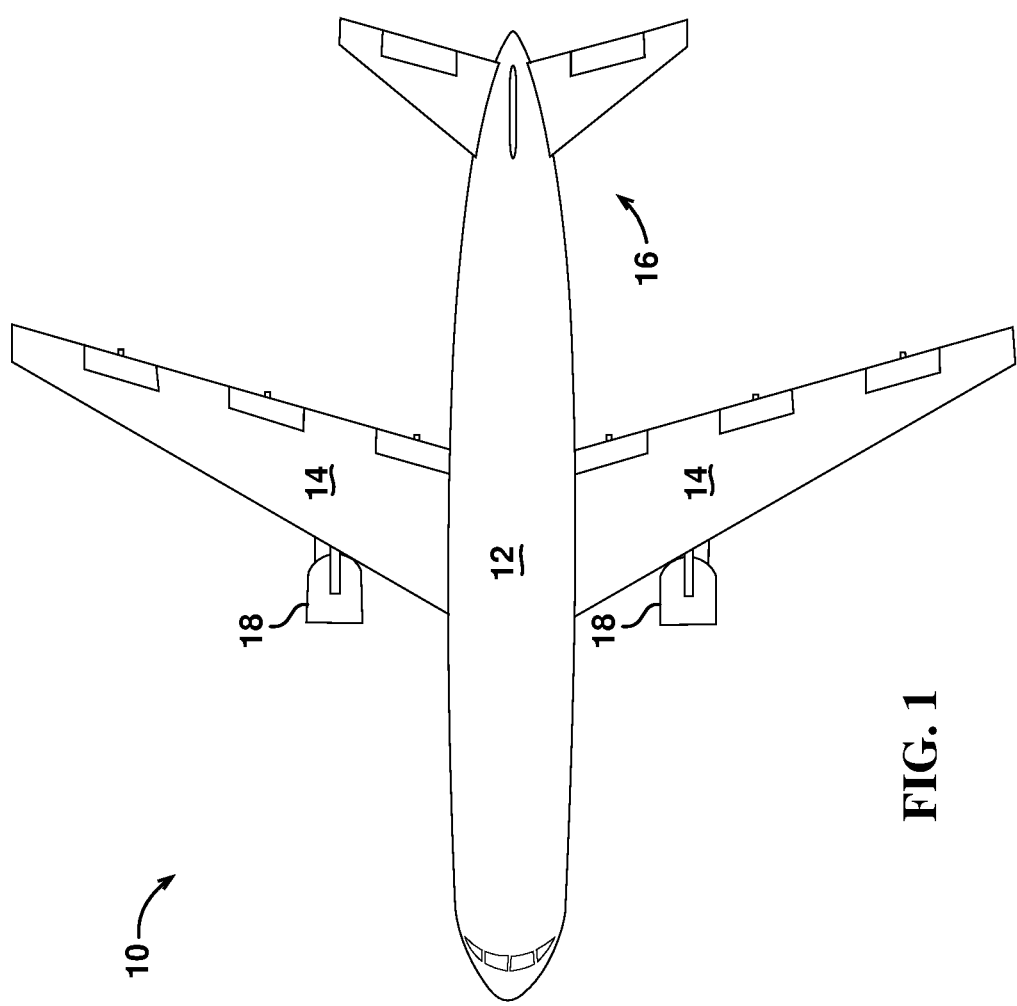
FIG. 1 is a perspective view of an exemplary aircraft with a propulsion system having a cooling system according one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present invention defines a novel cooling system for a gas turbine engine or the like. While the present invention can be used on a gas turbine engine and aircraft system as disclosed herein, it should be understood that the present invention is not limited as such and that it may be advantageously employed with any system that requires cooling via pressurized gas.

The gas temperature in the hot section of a gas turbine engine can exceed the melting temperature of the metal alloys that form hot section components such as the combustor, turbine and exhaust sections. As such, many hot section components rely on relatively cool pressurized bleed air (coolant) from the compressor to provide active cooling. This relatively cool air is typically routed through tubes and internal passageways within the hot section components where the coolant absorbs heat and is ultimately discharged through the exhaust system.

Two trends in modern gas turbine engines are necessitating improved cooling schemes. First, output power and thermal efficiency of a gas turbine engine are proportional to turbine inlet temperature. However, as the turbine inlet temperature increases additional cooling is required. Second, higher compression ratios directly increase engine efficiency, but as air compression increases, the temperature of the compressed air used as "coolant" also increases due to the compression process. The "hotter" cooling bleed air necessarily increases the complexity of cooling hot section components.

The present disclosure is directed to a cooling system and method that includes cooling a portion of the coolant via an energy separation device defined by the Ranque-Hilsch energy separation means. The Ranque-Hilsch separation means (energy separation device) includes a vortex tube that separates a single stream of high pressure gas into two output streams: one of higher temperature than the input stream and one of lower temperature than the input stream. Gas is injected tangentially into the device to induce a strong swirling motion in the flow, e.g. a vortex flow. The device has no moving parts and depends exclusively on the behavior of high pressure fluids with a vortical flow structure. Such flow exhibits a temperature separation phenomenon in which the high velocity fluid in the outer layers of the vortex increases in temperature while conversely the slower inner core of the vortex decreases in temperature. A vortex tube exploits this temperate gradient by exhausting the cooler vortex core through an orifice at one end and exhausting the hotter outer region through a radial opening at the opposite end of the device.

The energy separation device can be integrated as a micro vortex tube into a hot section component of an engine to induce energy separation so that the cooling air can be separated into a relatively "cooler" air stream and a relatively "warmer" air stream within that component. The micro vortex tubes can be sized to fit within a wall or a passage of the hot component such that it is in fluid communication with coolant inlet and outlet holes formed within the component. The micro vortex tubes can be separately formed and mechanically attached to a component or formed with the component via additive and subtractive manufacturing methods e.g. 3D printing. The resulting cooler air can be routed to locations requiring the lower temperature coolant and the warmer coolant can be routed to a region that does not require as much cooling. While compressed air is a typical coolant in a gas turbine engine environment, it should be understood that other gases or mixture of gases may be used as a coolant and remain within the scope of the present invention.

In addition to providing targeted cooling, micro vortex devices can be used to mitigate "turbine burning" where oxygen rich coolant acts as a flame holder in fuel-rich freestream conditions. In this undesirable situation, flames are held close to the surface of the component causing an increase in heat flux to the component. In regions of engines where this can occur, coolant can be ejected through apertures in the surface of the component, which will force the combustion reactions to occur further away. Because the unburned hydrocarbons are consumed further from the component surface, the region near the component surface is fuel-lean and thus safe for traditional film cooling. The warmer stream of coolant air can be ejected at a high angle to consume the unburned hydrocarbons and the cold coolant can be ejected at a lower angle relative to the surface in order to form a film cooling barrier to insulate the surface beneath the reaction zone to protect the surface from the nearby combustion.

Referring now to FIG. 1, there are illustrated some aspects of a non-limiting example of a vehicle 10 that is operable with a motive power source having novel cooling system with energy separation as will be described in detail below. In the illustrated embodiment, the vehicle 10 is in a form of an aircraft and the motive power source is a gas turbine engine, however the cooling system of the present invention is not limited to use in an aircraft or a gas turbine engine, but on the contrary may be used with any type of engine powered vehicle or stationary system that requires cooling fluid flow diverted from a working fluid. Such vehicles can include, but are not limited to aircraft, spacecraft, land vehicles, marine vehicles, including and without limitation, surface vessels, submarines and/or semi-submersibles, amphibious vehicles, or any combination thereof. In various forms, the vehicle 10 may be manned, unmanned and/or autonomous in operation. The exemplary aircraft 10 includes a fuselage 12, wings 14, an empennage 16 and a primary power system 18 in the form of a pair of gas turbine engines. The aircraft vehicle 10 may have only a single engine as a primary power source or a plurality of engines as a primary power source.

Figure 2:
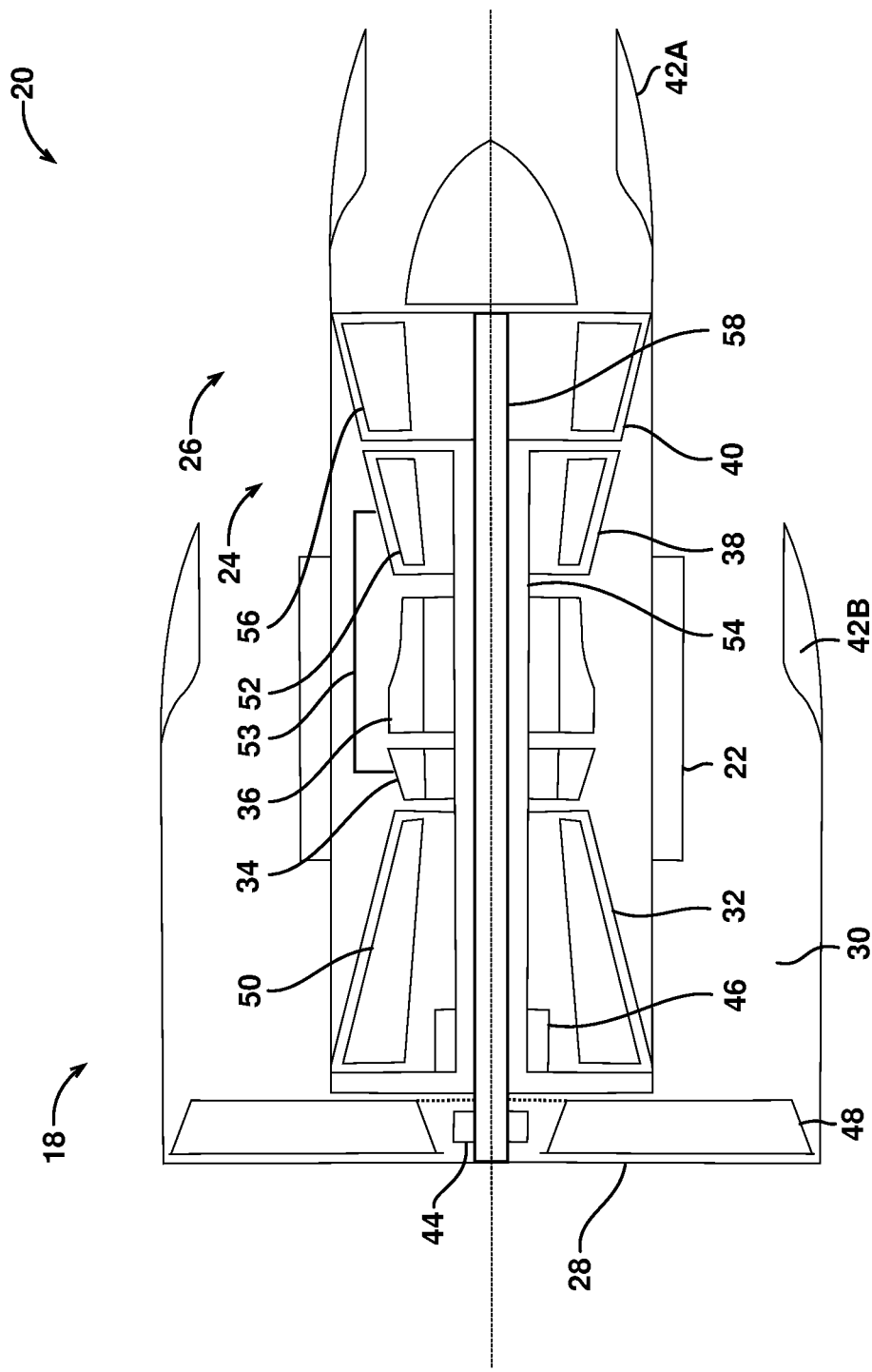
FIG. 2 is a schematic cross sectional view of a gas turbine engine that may be used as a power source for the aircraft of FIG. 1.

Referring to FIG. 2, there are illustrated some aspects of a non-limiting example of a propulsion system 18 in accordance with an embodiment of the present invention. The propulsion system 18 can include a gas turbine engine 20 that functions as a power source such as for a motive force and electrical power generation, etc. As is conventional with aircraft operation, propulsive thrust is provided by propulsion system 18. The primary power source can include a propulsive force that may be generated by one of a number of different means, for example and without limitation, one or more turbofans, propellers, turbines, prop fans and/or other rotor systems that generate thrust. Alternatively, the power output from the primary power source may also be converted to other mechanical means to provide motive power to land-based vehicles or water vessels as would be understood by one skilled in the art.

In the exemplary form, the gas turbine engine 20 includes a high pressure (HP) spool 24 and a low pressure (LP) spool 26. In other embodiments, the engine 20 may include three or more spools, e.g., may include an intermediate pressure (IP) spool and/or other spools. In the illustrated form, the engine 20 is a turbofan engine, wherein LP spool 26 is operable to drive a turbofan 28. In other embodiments, the engine 20 may be a turboprop engine, wherein the LP spool 26 powers a propeller system (not shown), e.g., via a reduction gearbox (not shown). In other embodiments, the engine 20 may be a turbojet engine powering a manned or unmanned air vehicle. In still other embodiments, the propulsion 28 may be a helicopter rotor or tilt-wing aircraft rotor.

The gas turbine engine 20 can include a bypass duct 30, a compressor system 32, a diffuser 34, a combustion system 36, a high pressure (HP) turbine system 38, a low pressure (LP) turbine system 40, a nozzle 42A, and a nozzle 42B. In other embodiments, there may be, for example, an intermediate pressure spool having an intermediate pressure turbine system. Pressurized bleed air may be ducted from any location upstream of the combustion system 36. The gas turbine engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. In other embodiments, the gas turbine engine 20 may also include an electrical machine 44 coupled to LP spool 26, and an electrical machine 46 coupled to HP spool 24. The electrical machines 44 and 46 are configured to convert mechanical power to electrical power, and to convert electrical power to mechanical power, e.g., an electric motor/electric generator. In other embodiments, one or both of electrical machines 44 and 46 may be configured to only convert mechanical power into electrical power, e.g., an electrical generator. In still other embodiments, one or both of electrical machines 44 and 46 may be configured to only convert electrical power into mechanical power, e.g., an electric motor. In one form, both electrical machine 44 and electrical machine 46 are configured to provide power to aircraft 10 during operation.

The fan system 28 includes a fan rotor system 48 driven by LP spool 26. In various embodiments, fan rotor system 48 includes one or more rotors (not shown) that are powered by turbine system 40. The fan system 28 may include one or more vanes (not shown). The bypass duct 30 is operable to transmit a bypass flow generated by fan system 28 around the core of engine 20. The compressor system 32 includes a compressor rotor system 50. In various embodiments, compressor rotor system 50 includes one or more rotors (not shown) that are powered by turbine system 38. The turbine system 38 includes a turbine rotor system 52. In various embodiments, turbine rotor system 52 includes one or more rotors (not shown) operable to drive compressor rotor system 50. The turbine rotor system 52 is drivingly coupled to compressor rotor system 50 via a shafting system 54. The turbine system 40 includes a turbine rotor system 56.

A bleed air conduit 53 can be fluidly coupled between the compressor system 50 and the turbine system 52. In other forms, the bleed conduit 53 can direct compressed air to any hot section component requiring cooling fluid to operate in a high temperature environment. In various embodiments, turbine rotor system 56 includes one or more rotors (not shown) operable to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. The turbine system 40 is operable to discharge the engine 20 core flow to the nozzle 42A.

Figure 3:
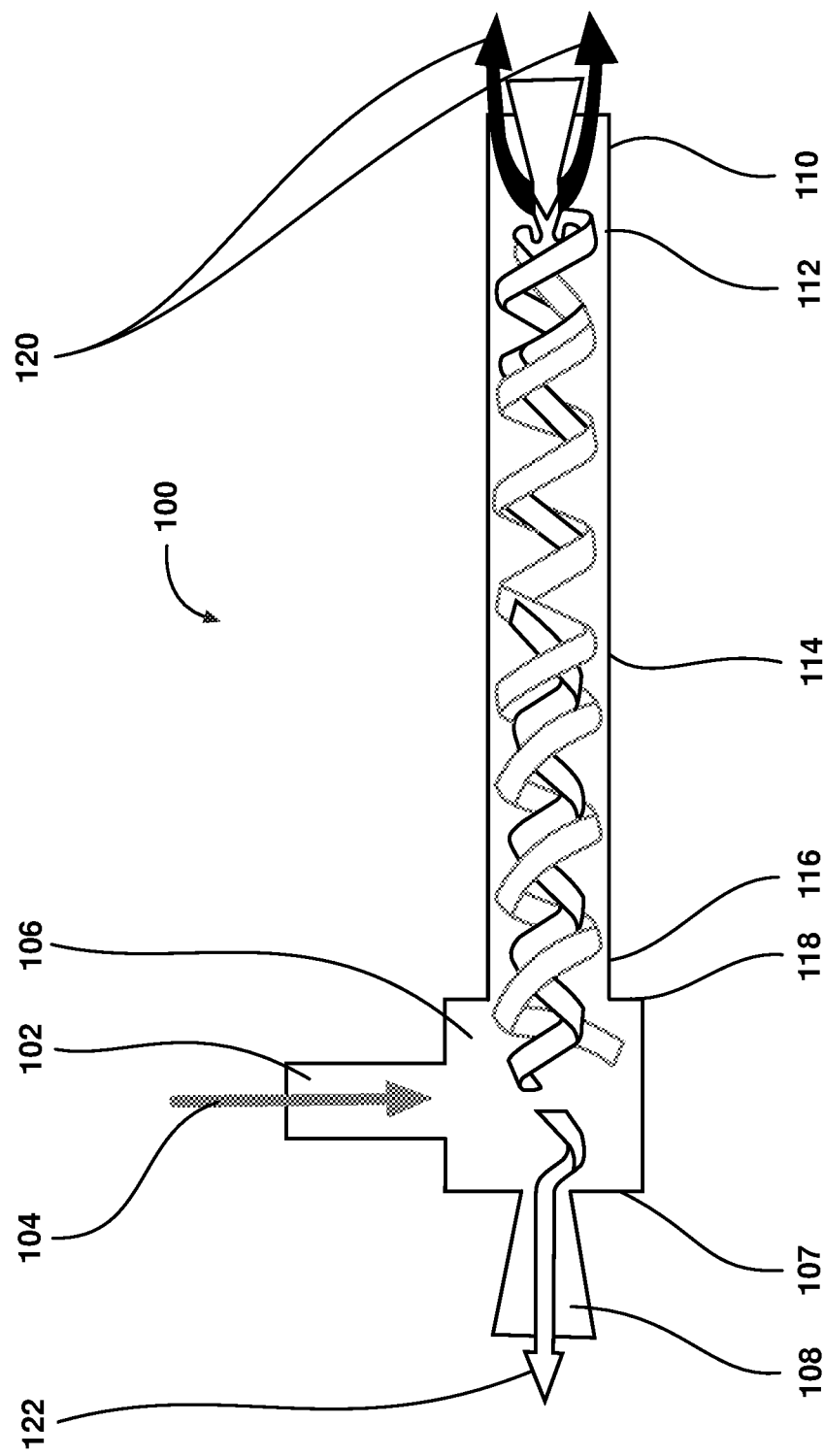
FIG. 3 is a cross sectional view of an exemplary energy separation device according to one embodiment of the present disclosure.

Referring now to FIG. 3, an energy separation device in the form of a vortex tube 100 is illustrated in schematic form. The vortex tube 100 includes an inlet 102 wherein an inlet flow in fluid communication with a source such as, by way of example and not limitation a compressor bleed flow discharged from a compressor of a gas turbine engine. A vortex separation chamber 106 is in fluid communication with the inlet 102. The vortex tube 100 includes a first outlet 108 fluidly coupled to the vortex chamber 106 at one side 107 and a second outlet 110 positioned at a distal end 112 of an elongate tube 114. A proximal end 116 of the elongate tube 114 is fluidly coupled to another side 118 of the vortex separation chamber 106. The vortex separation chamber 106 operates to separate the source inlet cooling fluid flow 104 into a relatively hotter flow stream 120 and a relatively cooler flow stream 122. The relative hotter flow stream 120 is discharged from the second outlet 110 of the vortex tube 100. The relative cooler flow stream 122 is discharged from the first outlet 108 of the vortex tube 100. In this manner the relatively cooler flow stream 122 can be directed to a component or a portion of a component requiring more cooling and the relatively hotter flow stream 120 can be directed to areas of the engine 18 that need relatively less cooling.

In an alternate embodiment, the relative hotter flow stream can be flow stream 122 and the relative cooler flow stream can be 120. The hotter and cooler flow streams 122, 120 and can be discharged through the outlets 108, 110, respectively. Either or both of the outlets 108 and 110 may feature an annular exit geometry or a central orifice geometry.

Figure 4:
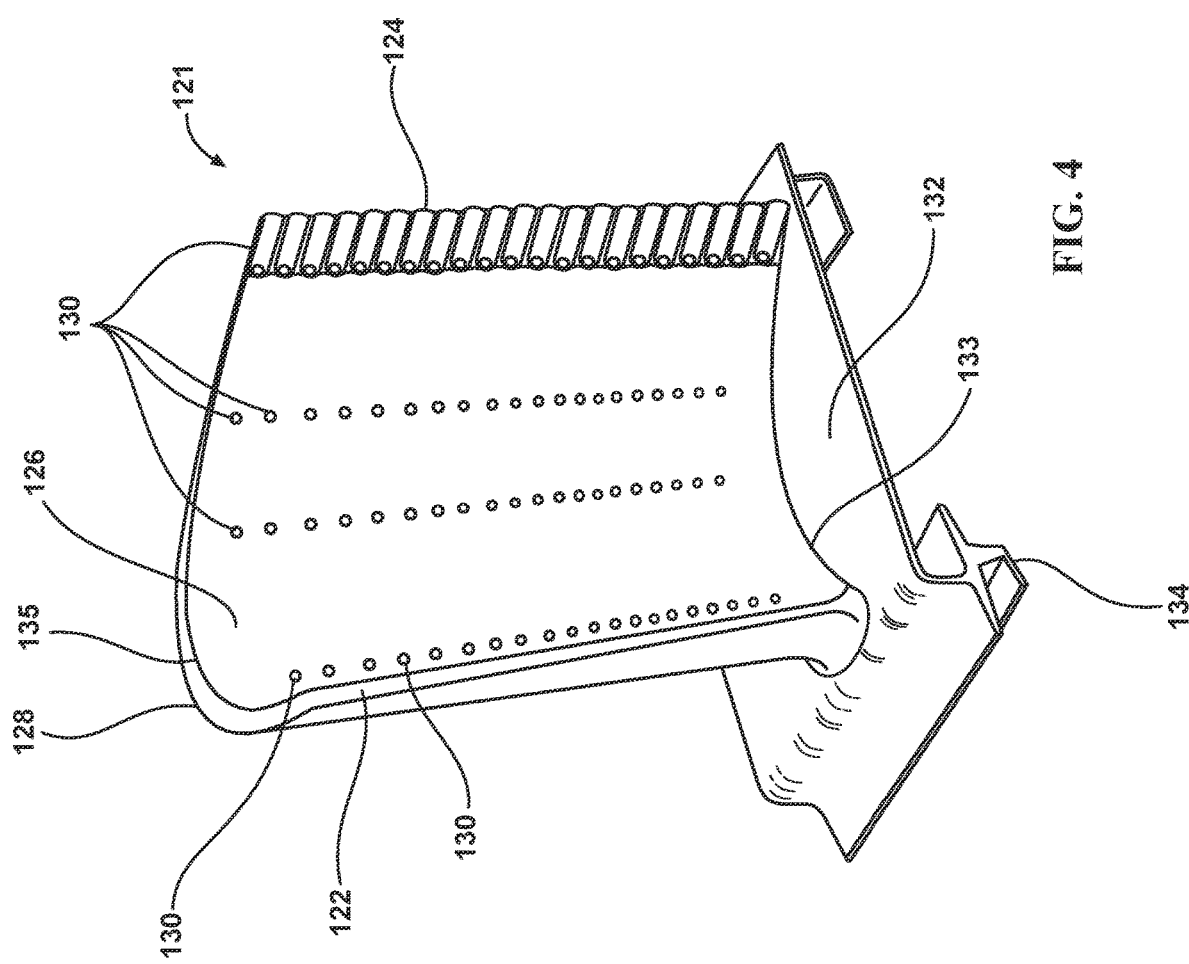
FIG. 4 is a perspective view of a turbine blade having a cooling system according to one embodiment of the present disclosure.

Referring now to FIG. 4, a turbine blade 121 is presented as representative component that may require cooling during engine operation. It should be understood that the cooling system and method disclosed herein is not limited to a turbine blade or vane as illustrated in the disclosed embodiment, but on the contrary may be practiced with any component that requires compressor bleed air cooling.

The turbine blade 121 includes a leading edge 122 that receives a hot working exhaust fluid from the combustor 36 and a trailing edge 124 downstream of the leading edge 122 in an axial direction. A pressure side wall 126 and a suction side wall 128 extend between the leading edge 122 and the trailing edge 124 on opposing sides thereof and are designed to extract work from the working fluid as is understood by those skilled in the art. The blade 121 extends radially outward from blade root 133 to a blade tip 135 to define a height of the blade 121. A platform 132 can be connected to the blade 121 proximate the root 133. The platform 132 can include various connectors 134 for connecting the blade to a rotating disk (not shown) or a static component (also not shown).

Figure 5:
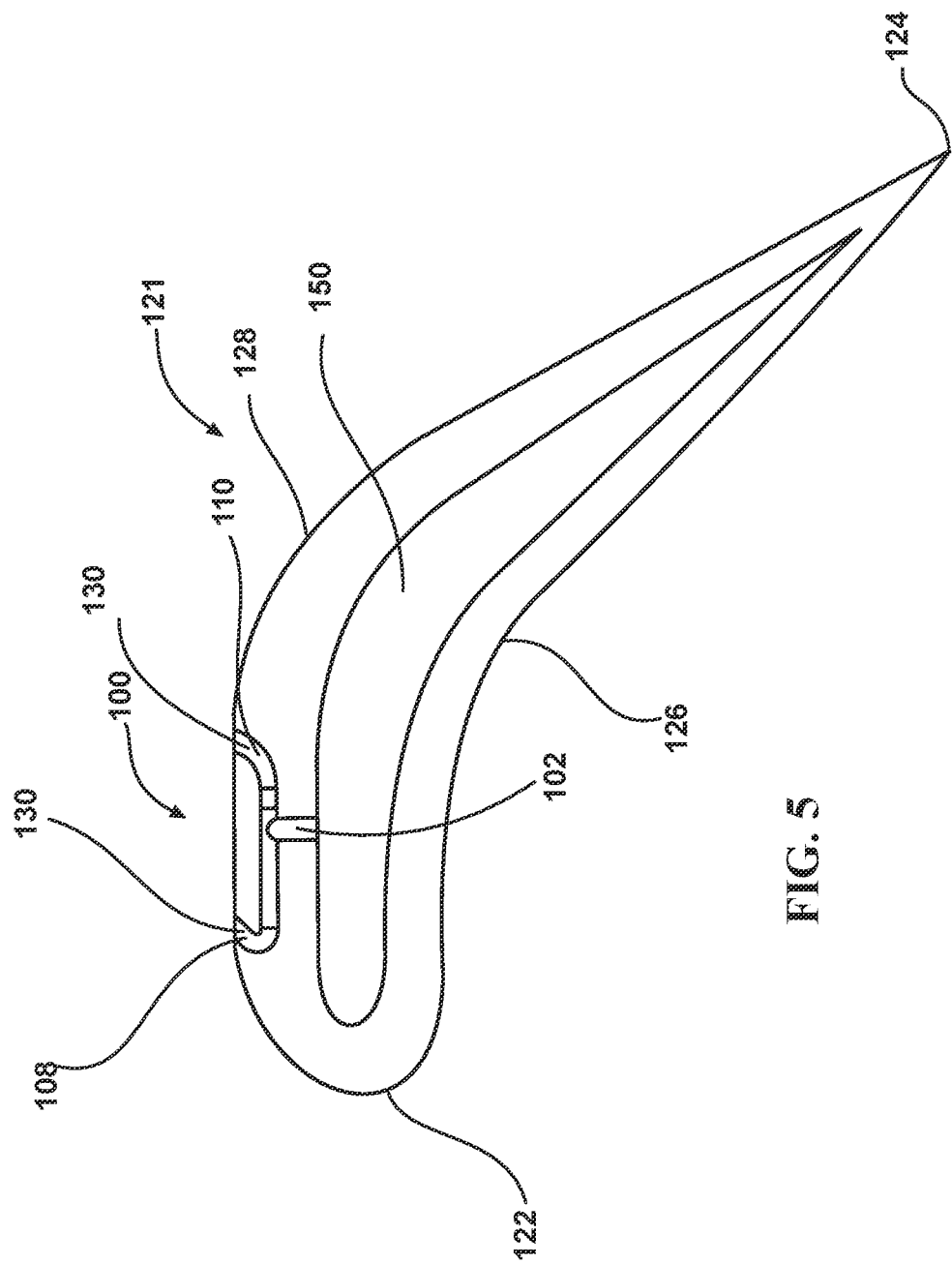
FIG. 5 is a cross sectional view of the turbine blade of FIG. 4.

Referring to FIG. 5, a cross-sectional view of the turbine blade 121 illustrates internal features thereof. A coolant manifold 150 receives compressed air bled from the compressor (not shown) and delivers a portion of the compressed cooling air to a miniaturized vortex tube 100 formed within the turbine blade 121. A vortex tube inlet 102 receives compressed air from the coolant manifold 150 and discharges relative cooler air to the first vortex tube outlet 108 in a manner that was previously described. The first vortex tube outlet 108 is in fluid communication with a cooling hole 130 extending through an outer surface of the suction side wall 128 proximate the leading edge 122 thereof. The vortex tube 100 discharges relatively hotter cooling flow to the second outlet 110 in fluid communication with another cooling hole 130 downstream of the first outlet 108 toward the trailing edge 124 of the blade 121. While a single vortex tube 100 is shown on the suction side of the blade 121 in the disclosed embodiment, it should be understood that vortex tubes 100 can be positioned anywhere in the blade 121 or in other areas of the engine 18 and the aircraft 10. Furthermore, a single vortex tube 100 may be configured to deliver relatively cool cooling air to a plurality of "cool" vortex device outlets 108 and relatively hot cooling air to a plurality of "hot" vortex outlets 110. In this manner, energy separation techniques may be used to more effectively cool components in an engine and a vehicle using a compressed fluid source such as air.

Figure 6:
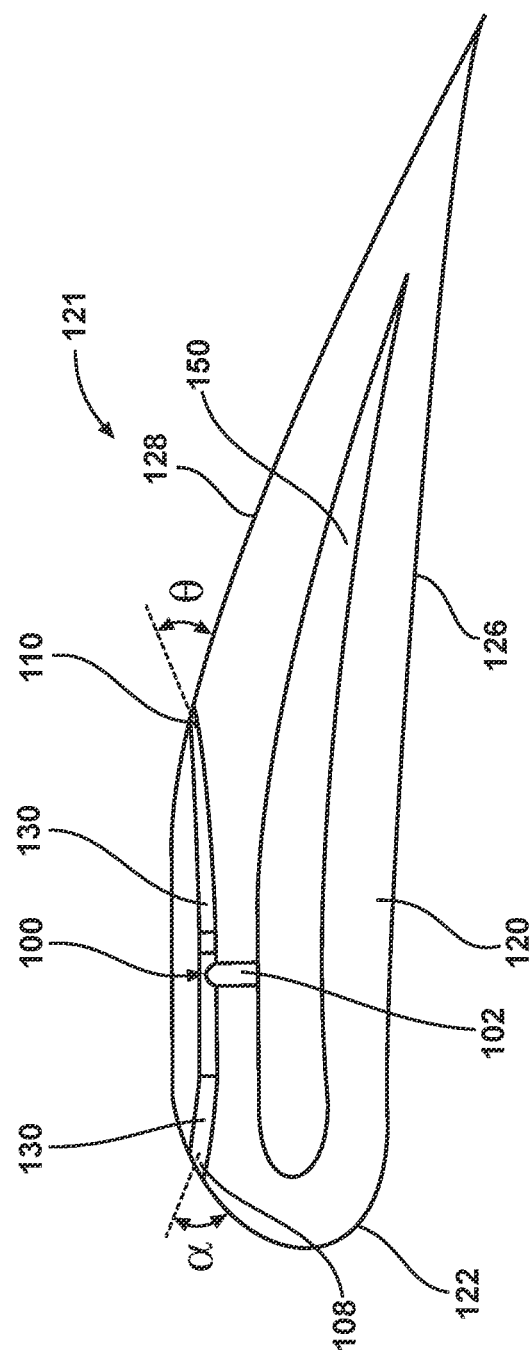
FIG. 6 is another cross sectional view of a turbine blade.

FIG. 6 is another cross-sectional view of the turbine blade 121. The mini vortex tube 100 can be configured such that the outlet passageways 108 and 110 can project through an outer surface 128 at different or varying angles. In some forms, an angle α associated with outlet 108 can be greater than an angle θ associated with outlet 110. The cooling flow exiting outlet 108 projects further away from the outer surface 128 of the turbine blade 121 relative to the cooling flow exiting outlet 100. In some forms, the cooling flow from outlet 108 can project further away from the surface 128 to provide a source of oxidant to facilitate burning of any remaining unburned fuel in the primary flowpath. The cooling flow from outlet 110 can provide a film cooling flow across the surface 128 of the turbine blade 121. It should be understood that the outlet angles α, θ may be equivalent in some embodiments and that angle θ may be greater than angle α in other embodiments depending on engineering requirements for a particular application.

In one aspect the present disclosure includes a gas turbine engine system comprising: a compressor; a combustor positioned downstream of the compressor configured to generate hot combustion gas; a turbine positioned downstream of the compressor; a plurality of hot section components heated by the combustion products; a cooling system configured to transport cooling air from the compressor to a hot section component; and an energy separation device positioned within the cooling system such that cooling air is split into a relative hotter portion and a relative cooler portion; wherein the relative hotter portion and the relative cooler portion exits the hot section component at different angles relative to an outer surface thereof.

In refining aspects the cooler portion is directed to an area of the turbine engine having relatively high cooling requirements; the energy separation device includes a vortex tube; the vortex tube includes one inlet port and two outlet ports; the inlet port is in fluid communication with a working fluid from the compressor; the hot section component includes at least one of a combustor, a turbine and/or other exhaust components downstream of the combustor; the turbine includes a plurality of static turbine vanes and rotatable turbine blades having internal fluid cooling passageways; wherein at least one of the internal passageways includes one or more energy separation devices; and wherein the one or more energy separation devices direct relative cooler working fluid toward a leading edge and relative hotter working fluid toward a trailing edge of the turbine vane and/or the turbine blade.

In another aspect, a heat producing apparatus comprises: a hot section component; an internal flow path configured to transport a pressurized cooling fluid to the hot section component; an energy separation device positioned within the hot section component that separates the cooling fluid into a relatively cooler portion and a relatively hotter portion; wherein the relative cooler portion is directed to a region requiring greater cooling than other regions within the component; and wherein the cooler portion exits the hot section component at a first angle relative to a surface and the hotter portion exits the hot section component at a second angle that is different than the first angle.

In refining aspects, the energy separation device is formed integrally within the hot section component; the hot section component is one of a combustor structure, a turbine structure, and/or an exhaust nozzle structure; the cooling fluid is bled from a compressor of a gas turbine engine; the relatively cooler portion of the cooling fluid is directed though a first outlet hole formed with a relatively low discharge angle through a surface of the hot section component, the first outlet hole provides a film cooling flow across the surface of the hot section component; the relative hotter portion of the cooling fluid is directed though a second outlet hole formed through a surface of the hot section component, and wherein the second outlet hole has a higher discharge angle relative to the first outlet hole.

In another aspect a method comprises: transporting a cooling fluid from a fluid compressor to a relatively hot component in an engine during operation; moving the cooling fluid through an energy separation device; discharging a relative cooler cooling fluid and a relatively hotter cooling fluid from the energy separation device; and directing the relative cooler cooling fluid to a first region in the engine requiring higher cooling and the relative hotter cooling fluid to a second region in the engine requiring lower cooling than the first region.

In refining aspects of the method, the first region includes at least one of a combustor liner, a turbine vane, a turbine blade and an exhaust nozzle; the first region is proximate a leading edge of at least one of a turbine vane and/or a turbine blade and the second region is downstream of the leading edge of the at least one turbine vane and/or turbine blade; and the energy separation device is located internal to the relative hot component in the engine.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A gas turbine engine system comprising:
   a compressor;
   a combustor positioned downstream of the compressor configured to generate hot combustion gas;
   a turbine positioned downstream of the compressor;
   a plurality of hot section components heated by the combustion products;
   wherein each of the plurality of hot section components includes a first side and an opposing second side;
   a conduit configured to transport cooling air from the compressor to a hot section component of the plurality of hot section components;
   an energy separation device positioned within the hot section component such that the cooling air is split into a relatively hotter portion and a relatively cooler portion;
   wherein the relatively hotter portion and the relatively cooler portion exit the hot section component at different angles relative to an outer surface of a same side of one of the first or second sides.

2. The gas turbine engine system of claim 1, wherein the relatively cooler portion is directed to an area of the hot section component having relatively high cooling requirements.

3. The gas turbine engine system of claim 1, wherein the energy separation device includes a vortex tube.

4. The gas turbine engine system of claim 3, wherein the vortex tube includes one inlet port and two outlet ports.

5. The gas turbine engine system of claim 4, wherein the inlet port is in fluid communication with the cooling air from the compressor.

6. The gas turbine engine system of claim 1, wherein at least one of a combustor, a turbine and/or other exhaust components downstream of the combustor includes the hot section component.

7. The gas turbine engine system of claim 6, wherein the turbine includes a plurality of static turbine vanes and rotatable turbine blades having internal fluid cooling passageways.

8. The gas turbine engine system of claim 7, wherein at least one of the internal passageways includes the energy separation device.

9. The gas turbine engine system of claim 8, wherein the energy separation device directs the relatively cooler portion toward a leading edge and the relatively hotter portion toward a trailing edge of at least one of the plurality of static turbine vanes and/or rotatable turbine blades.

10. A method comprising:
    a gas turbine engine system comprising:
        a compressor;
        a combustor positioned downstream of the compressor configured to generate hot combustion gas;
        a turbine positioned downstream of the compressor;
        a plurality of hot section components heated by the combustion products;
        wherein each of the plurality of hot section components includes a first side and an opposing second side;
        a conduit configured to transport cooling air from the compressor to a hot section component of the plurality of hot section components;
        an energy separation device positioned within the hot section component such that the cooling air is split into a relatively hotter portion and a relatively cooler portion;
        wherein the relatively hotter portion and the relatively cooler portion exit the hot section component at different angles relative to an outer surface of a same side of one of the first or second sides, transporting the cooling air from the compressor to the hot section component in the gas turbine engine system during operation;

moving the cooling air through the energy separation device;

discharging the relatively cooler portion and the relatively hotter portion from the energy separation device; and directing the relatively cooler portion to a first region of the same side requiring more cooling and directing the relatively hotter portion to a second region of the same side requiring less cooling than the first region.

11. The method of claim 10, wherein the hot section component includes at least one of a combustor liner, a turbine vane, a turbine blade and an exhaust nozzle.

12. The method of claim 10, wherein the first region is proximate a leading edge of at least one of a turbine vane and/or a turbine blade and the second region is downstream of the leading edge of the at least one of a turbine vane and/or a turbine blade.

\* \* \* \* \*